United States Patent
Fidkowski et al.

(10) Patent No.: US 6,457,327 B1
(45) Date of Patent: Oct. 1, 2002

(54) PROCESS FOR CONCENTRATING FLUORINE COMPOUNDS

(75) Inventors: Zbigniew Tadeusz Fidkowski, Macungie, PA (US); John Frederick Cirucci, Schnecksville, PA (US); Rakesh Agrawal, Emmaus, PA (US); Timothy Edward Conway, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/567,164

(22) Filed: May 8, 2000

(51) Int. Cl.$^7$ .................................................. F25J 3/00
(52) U.S. Cl. ........................................................ 62/632
(58) Field of Search ...................................... 62/617, 632

(56) References Cited

U.S. PATENT DOCUMENTS

| | | |
|---|---|---|
| 5,069,887 A | 12/1991 | Suenaga et al. ............ 423/240 |
| 5,150,577 A | 9/1992 | Mitchell et al. ................ 62/18 |
| 5,183,647 A | 2/1993 | Harada et al. ............... 423/239 |
| 5,502,969 A | 4/1996 | Jin et al. ......................... 62/11 |
| 5,626,023 A | 5/1997 | Fisher et al. .................. 62/625 |
| 5,771,713 A | 6/1998 | Fisher .......................... 62/625 |
| 5,779,863 A | 7/1998 | Ha et al. ....................... 203/74 |
| 5,832,746 A | 11/1998 | Nagamura .................... 62/623 |

FOREIGN PATENT DOCUMENTS

WO        9924358        5/1999        ......... C01B/21/083

*Primary Examiner*—William C. Doerrle
*Assistant Examiner*—Malik N. Drake
(74) *Attorney, Agent, or Firm*—Geoffrey L. Chase

(57) ABSTRACT

The process removes from a diluted gas one or more fluorine compounds present at a first concentration in the diluted gas and concentrates the fluorine compounds. This is done by directly contacting the diluted gas with a cryogenic liquid having a temperature less than or equal to about −150° F., thereby producing a vapor lean in the fluorine compounds and liquid enriched with the fluorine compounds at a second concentration. The second concentration is greater than the first concentration.

22 Claims, 1 Drawing Sheet

PROCESS FOR CONCENTRATING FLUORINE COMPOUNDS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention pertains to the removal of fluorine compounds from a multicomponent fluid and concentration of the removed fluorine compounds, and in particular to the concentration of fluorine compounds to be transferred to a separation process using at least one distillation column.

Fluorine compounds are widely used in the manufacture of semiconductors. These compounds can be costly and detrimental to the environment, if released.

In the manufacturing processes of some fluorine compounds, such as nitrogen trifluoride, nitrogen is produced as a reaction byproduct appearing as a diluent in the nitrogen trifluoride product stream. Dilution with inert gases, such as nitrogen or helium, is commonly performed for purging process equipment or to reduce reactivity of fluorine compounds during processing. In some cases, the dilution can be significant with a fluorine compounds content of 10% by volume, or less. The fluorine compounds may be recovered and purified by cryogenic distillation.

Diluted streams of fluorine compounds also are created in the process of manufacturing semiconductors. Because of the high costs of fluorine compounds and the detrimental effects of these compounds on the environment, it is desirable to recover and reuse these compounds. The fluorine compounds also may be purified by cryogenic distillation.

Cryogenic distillation equipment used to recover and purify fluorine compounds from a diluent gas could be significantly reduced in size if the fluorine compounds were not so diluted. Such a reduction in size would reduce the capital and operating costs of the distillation equipment.

Also, the flow rates and concentrations of streams of diluted fluorine compounds may vary. For improved operability, it is desirable to stabilize the feed to a continuous distillation system. For example, this may be done by creating a storage capacity for the feed. This storage capacity should be cost effective, since the volume of the concentrated feed is reduced in comparison with the volume of the original, diluted feed.

If a batch distillation is used, it is necessary to store the feed mixture for the next available batch. The size reduction of the feed storage could be achieved by initial concentration of the fluorine compounds in the feed.

Initially, since the flow rates of fluorine compounds from reactors and of fluorine compounds recovered from semiconductor fabrication plants usually were relatively low, the issue of pre-concentrating diluted streams was not significant. With the development of the electronic industry, the demand for fluorine compounds has increased significantly, causing increases in production rates and use. Now, the issue of pre-concentrating fluorine compounds from dilute streams is economically and environmentally attractive.

U.S. Pat. No. 5,832,746 (Nagamura) discloses a cryogenic distillation process for the purification of nitrogen trifluoride without any initial pre-concentration step. In U.S. Pat. Nos. 5,502,969 (Jin, et al.) and 5,771,713 (Fisher) an absorption column is used prior to distillation to absorb fluorine compounds in a "wash liquid", for example perfluoropropane ($C_3F_8$), propane, ethane or a mixture thereof. The disadvantage of adding a new component (i.e., a wash liquid) is that this component eventually must be separated from the fluorine component, for example by cryogenic distillation. Also, a wash liquid containing fluorine compounds may absorb some diluent gas and other impurities. However, the wash liquid keeps certain fluorine components from solidifying and reduces the vapor pressure of the fluorine compounds, as described in U.S. Pat. No. 5,626,023 (Fisher, et al.).

U.S. Pat. No. 5,150,577 (Mitchell, et al.) discloses a system and method for recovering and purifying halocarbon compounds, particularly halon. Halocarbon compounds diluted in nitrogen are partially liquefied by indirect heat exchange with a cooling liquid, for example liquid nitrogen. A liquefied fraction is collected and the vapor fraction (comprising nitrogen and a small amount of halocarbons) is vented through a carbon adsorber, where the organic halocarbon vapor is adsorbed and effectively removed from the nitrogen gas. The adsorbed halocarbons are periodically recovered from the adsorber by vacuum desorption and recycled back to the feed gas.

Other patents related to fluorine compounds deal with purification of fluorine compounds from certain components by adsorption (U.S. Pat. No. 5,069,887—removal of $CF_4$) (Suenago, et al.) or by chemical decomposition (U. S. Pat. No. 5,183,647—removal of $N_2F_2$) (Harada, et al.).

U.S. Pat. No. 5,779,863 (Ha, et al.) discloses a method for separating and purifying perfluorocompounds (PFC's) using a cryogenic distillation system.

It is desired to reduce the capital and operating costs of cryogenic distillation systems for recovering and purifying fluorine compounds by pre-concentrating the compounds in a diluent gas prior to distillation.

It is further desired to improve the operability of continuous cryogenic distillation systems by introducing, in a cost-effective way, additional storage capacity for a concentrated feed stream, which stabilizes the flow rate and composition of the fluorine compounds entering such a distillation system.

It is still further desired to have a process which provides a cost effective (reduced in size) feed storage for batch distillation.

It is still further desired to have a process to pre-concentrate fluorine compounds in a safe and effective manner, without any releases to the environment.

It also is desired to have a process for removing from a multicomponent fluid one or more fluorine compounds present at a first concentration in said multicomponent fluid and for concentrating said fluorine compounds which overcomes the difficulties and disadvantages of the prior art to provide better and more advantageous results.

BRIEF SUMMARY OF THE INVENTION

The present invention is a process for removing from a diluted gas one or more fluorine compounds present in a first concentration in the diluted gas and for concentrating the fluorine compounds. This is done by directly contacting the diluted gas with a cryogenic liquid having a temperature less than or equal to about –150° F., thereby producing a vapor lean in the fluorine compounds and a liquid enriched with the fluorine compounds at a second concentration. The second concentration is greater than the first concentration.

There are a variety of variations of the invention. For example, the diluted gas contains at least one diluent compound selected from the group consisting of nitrogen, oxygen, argon and helium. Each of the fluorine compounds contains at least one fluorine atom. Also, the diluted gas may contain at least one fluorine compound from the group consisting of nitrogen trifluoride ($NF_3$), freon–14 or tetrafluoromethane ($CF_4$), freon –23 or trifluoromethane ($CHF_3$) and hexafluoroethane ($C_2F_6$).

In another variation, the first concentration is preferably less than or equal to about 50 mole % and more preferably less than or equal to about 20 mole %.

In another variation, the cryogenic liquid is selected from the group consisting of liquid nitrogen, liquid oxygen, liquid argon, liquid helium and mixtures thereof.

In another variation, the diluted gas is directly contacted with the cryogenic liquid in a heat and mass transfer device having a top and a bottom. In a variant of this variation, the cryogenic liquid is introduced at the top of the heat and mass transfer device and the diluted gas is introduced at the bottom of the heat and mass transfer device.

In yet another variation, the diluted gas is indirectly heat exchanged with the vapor lean in the fluorine compounds.

In another aspect of the invention, the liquid enriched with the fluorine compounds at the second concentration is transferred to a separation unit comprising at least one distillation column.

Another embodiment of the invention is a process for removing from a multicomponent fluid one or more fluorine compounds present at a first concentration in the multicomponent fluid and for concentrating the fluorine compounds. The process uses a vessel having a top, a bottom, and a heat and mass transfer zone between the top and the bottom. The process comprises multiple steps. The first step is to feed the multicomponent fluid to the vessel at a first feed location below the heat and mass transfer zone. The second step is to feed a cryogenic liquid to the vessel at a second feed location above the heat and mass transfer zone, the cryogenic liquid having a temperature less than or equal to about–150° F. The third step is to remove a vapor lean in fluorine compounds from the top of the vessel. The fourth step is to remove a liquid enriched with fluorine compounds and a second concentration from the vessel at a location below the first feed location, the second concentration being greater than the first concentration.

This embodiment also has a number of variations. For example, the multicomponent fluid contains at least one diluent component selected from the group consisting of nitrogen, oxygen, argon, and helium. Each of the fluorine compounds contains at least one fluorine atom. Also, the multicomponent fluid may contain at least one fluorine compound from the group consisting of nitrogen trifluoride ($NF_3$), freon–14 or tetrafluoromethane ($CF_4$), freon–23 or trifluoromethane ($CHF_3$) and hexafluoroethane ($C_2F_6$).

In another variation, the first concentration is preferably less than or equal to about 50 mole % and more preferably less than or equal to about 20 mole %.

In addition, there are other variations. For example, the cryogenic liquid is selected from the group consisting of liquid nitrogen, liquid oxygen, liquid argon, liquid helium, and mixtures thereof. In one variation, the multicomponent fluid is directly contacted with the cryogenic liquid in the heat and mass transfer zone. In another variation, the multicomponent fluid is indirectly heat exchanged with the vapor lean in the fluorine compounds.

In another aspect of the invention, the liquid enriched with the fluorine compounds in a second concentration is transferred to a separation unit comprising at least one distillation column.

BRIEF DESCRIPTION OF SEVERAL VIEWS OF THE DRAWINGS

The invention will be described by way of example with reference to the accompanying drawing in which.

DETAILED DESCRIPTION OF THE INVENTION

Figure 1:
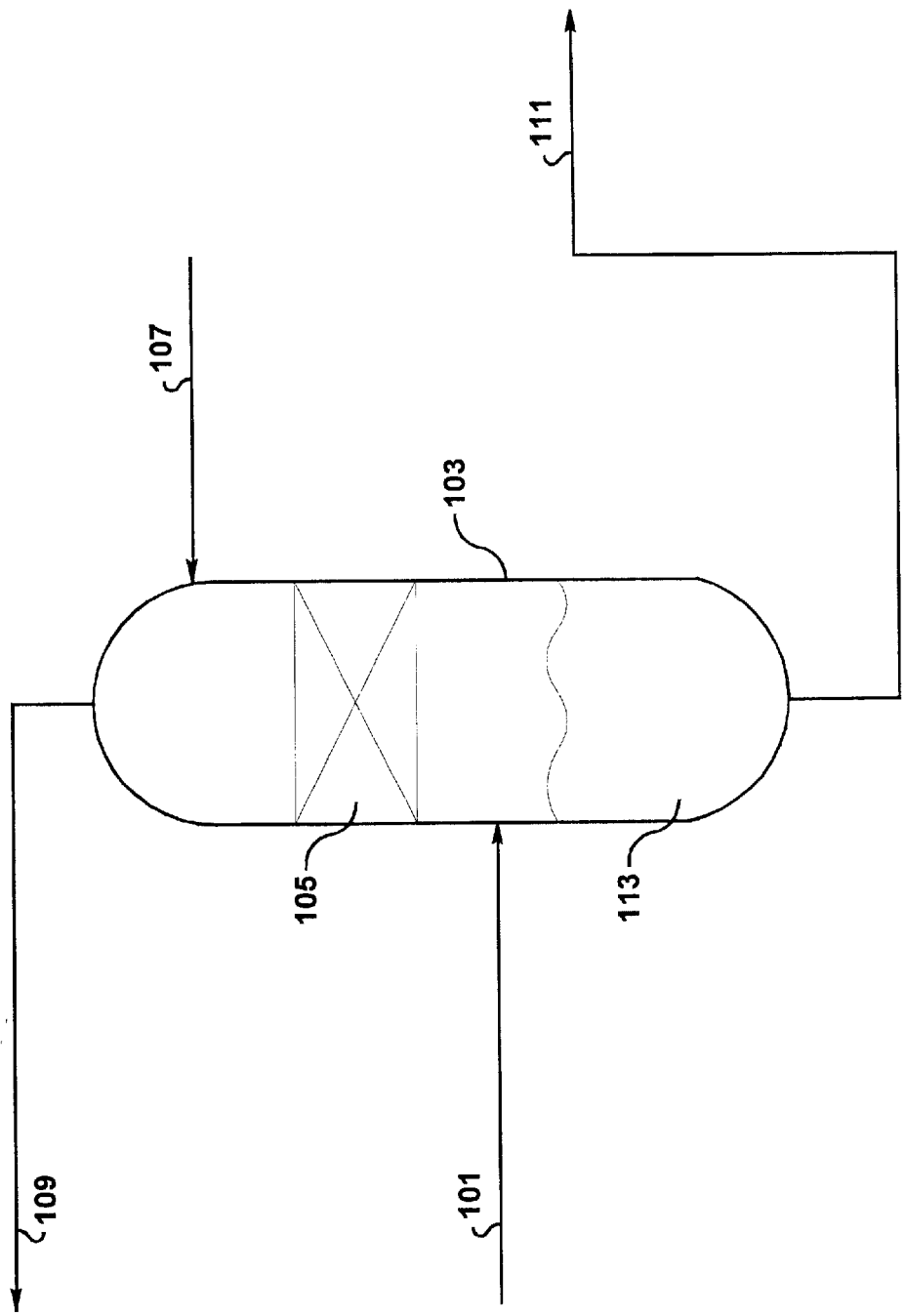
FIG. 1 is a schematic diagram of an embodiment of the present invention.

The invention is a process for concentrating fluorine compounds from a diluted gaseous stream, wherein the diluted gaseous stream containing fluorine compounds is directly contacted with a cryogenic liquid at a temperature below–150° F., such that a vapor phase lean in fluorine compounds is produced and a liquid phase concentrated in fluorine compounds is collected, and such that the concentration of fluorine compounds in the liquid phase is greater than the concentration in the diluted gaseous stream.

The diluent component in the diluted gaseous stream containing fluorine compounds may contain nitrogen, oxygen, argon, helium or a mixture thereof. The process is applicable to any fluorine compound and, in particular, it can be used for concentrating mixtures containing any of the following fluorine components: nitrogen trifluoride ($NF_3$), freon–14 or tetrafluoromethane ($CF_4$), freon–23 or trifluoromethane ($CHF_3$) and hexafluoroethane ($C_2F_6$).

The process of concentrating fluorine compounds from a diluted gaseous stream is especially attractive when the concentration of a fluorine compound in the diluted gaseous stream is less than 50 mole % and more preferably less than 20 mole %.

Any cryogenic liquid at a temperature lower than–150° F. may be used to concentrate fluorine compounds in a liquid phase. However, the most preferable cryogenic liquid is liquid nitrogen. It is desirable to contact the diluted feed gas with the cryogenic liquid using a mass transfer zone contacting device in the form of packing or trays. This will happen naturally when the cryogenic liquid is introduced at the top of the contacting device and the diluted gaseous stream is introduced at the bottom. Then, the gaseous phase, lean in fluorine compounds, will leave at the top of the contacting device, and the liquid phase, concentrated in fluorine compounds, can be collected from the bottom of the contacting device. The resulting liquid phase concentrated in fluorine compounds may be sent to a separation unit (such as a distillation or adsorption unit) for further purification and collection of fluorine compounds.

A preferred embodiment of the present invention is shown in FIG. 1. A fluorine compound diluted in a diluent gas and cooled down to a cryogenic temperature is introduced as stream 101 to a heat and mass transfer device 103. Stream 101 may be introduced as a vapor or may be partially liquefied. The device 103 comprises a vessel containing a heat and mass transfer zone 105 in the form of distillation trays or packing. In zone 105 the rising gas from stream 101 is contacted with a cryogenic liquid introduced as stream 107, resulting in a fluorine compound-free diluent gas removed as stream 109 and a mixture of the concentrated fluorine compound and the diluent gas in a liquefied form removed as stream 111. The cryogenic liquid (stream 107) can be supplied from an external source or from a condenser (not shown) that liquefies at least a portion of the fluorine compound-free diluent gas 109.

If desired for stable operability, or in cases where storage is required in a batch process, this mixture also can be stored in the built-in sump volume 113. Refrigeration in stream 109 can also be recovered by heat exchange with any process stream warmer than stream 109. For example, the feed stream 101 can be indirectly contacted with stream 109 in a heat exchanger (economizer) (not shown). The feed stream can be cooled down to any temperature close to its dew point or even close to its bubble point temperature. When the refrigeration from stream 109 is recovered, the required flow of the liquefied diluent gas 107 can be reduced.

Because of the large volatility difference between the diluent gas (usually nitrogen) and fluorine compounds (for example $NF_3$, $CF_4$, $CHF_3$, $C_2F_6$), the heat and mass transfer zone 105 can be relatively small—usually two (2) theoretical stages of separation is sufficient to purify the exiting diluent gas vapor from the fluorine An example of pre-concentrating $NF_3$ in a diluent nitrogen gas is shown in Table 1.

TABLE 1

An example of pre-concentrating $NF_3$ in a diluent nitrogen gas

| stream | Flow rate lb-mol/h | Temperature F. | Pressure psi | $N_2O$ ppm | $NF_3$ mole frac | $O_2$ mole frac | $N_2$ mole frac |
|---|---|---|---|---|---|---|---|
| 101 | 1.00 | −242 | 17 | 25 | 0.100 | 0.030 | 0.570 |
| 107 | 0.65 | −306 | 35 | 0 | 0 | 0 | 1.000 |
| 109 | 1.42 | −318 | 17 | 0 | 2E−7 | 0.010 | 0.990 |
| 111 | 0.23 | −311 | 17 | 100 | 0.435 | 0.058 | 0.507 |

The heat and mass transfer zone is crucial for the efficient operation of the pre-concentrating device. If the zone was not used, and instead the feed stream 101 was partially liquefied and flashed in the vessel, at the same high recovery of $NF_3$, about 80% of the feed needs to be liquefied (i.e., flow of stream 111 would be about 0.8 lb-mol/h). of the heat and mass transfer zone (equivalent just to 2 theoretical stages) allows for reduction of this flow to about 3.5 times, i.e., from about 0.8 lb-mol/h to about 0.23 lb-mol/h.

The invention enables an end user to pre-concentrate fluorine compounds in a diluent gas before cryogenic distillation. The degree of pre-concentration is much higher than if a conventional method (e.g., flash) was used. Therefore, the invention decreases the capital cost and the operating cost of the cryogenic distillation of fluorine compounds.

Furthermore, the present invention improves the operability of a continuous distillation system by introducing, in a cost-effective way, the additional storage capacity for a concentrated feed stream. This stabilizes the flow rate and composition of the fluorine compounds entering the distillation system. This storage capacity is cost effective, since the volume of the concentrated feed is reduced in comparison with the volume of the original, diluted feed.

The present invention also provides a cost effective (reduced in size) feed storage for batch distillation. It also prevents fluorine compounds from being released to the environment.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A process for removing from a diluted gas one or more fluorine compounds present at a first concentration in said diluted gas and for concentrating said fluorine compounds, comprising: directly contacting said diluted gas with a cryogenic liquid having a temperature less than or equal to about −150° F., and thereby producing a vapor lean in said fluorine compounds and a liquid enriched with said fluorine compounds at a second concentration, said second concentration being greater than said first concentration.

2. A process as in claim 1, wherein said diluted gas contains at least one diluent compound selected from the group consisting of nitrogen, oxygen, argon and helium.

3. A process as in claim 1, wherein each of said fluorine compounds contains at least one fluorine atom.

4. A process as in claim 1, wherein said diluted gas contains at least one fluorine compound from the group consisting of nitrogen trifluoride ($NF_3$), freon −14 or tetrafluoromethane ($CF_4$), freon −23 or trifluoromethane ($CHF_3$) and hexafluoroethane ($C_2F_6$).

5. A process as in claim 1, wherein said first concentration is less than or equal to about 50 mole %.

6. A process as in claim 1, wherein said cryogenic liquid is selected from the group consisting of liquid nitrogen, liquid oxygen, liquid argon, liquid helium, and mixtures thereof.

7. A process as in claim 1, wherein said diluted gas is directly contacted with said cryogenic liquid in a heat and mass transfer device having a top and a bottom.

8. A process as in claim 7, wherein said cryogenic liquid is introduced at the top of said heat and mass transfer device and said diluted gas is introduced at the bottom of said heat and mass transfer device.

9. A process as in claim 1, wherein said liquid enriched with said fluorine compounds at said second concentration is transferred to a separation unit comprising at least one distillation column.

10. A process as in claim 1, wherein said diluted gas is indirectly heat exchanged with said vapor lean in said fluorine compounds.

11. A process as in claim 1, wherein at least a portion of said liquid enriched with said fluorine compounds at a second concentration is held in a storage container.

12. A process for removing from a multicomponent fluid one or more fluorine compounds present at a first concentration in said multicomponent fluid and for concentrating said fluorine compounds, said process using a vessel having a top, a bottom, and a heat and mass transfer zone between the top and the bottom, comprising the steps of:

feeding said multicomponent fluid to said vessel at a first feed location below said heat and mass transfer zone;

feeding a cryogenic liquid to said vessel at a second feed location above said heat and mass transfer zone, said cryogenic liquid having a temperature less than or equal to about −150° F.;

removing a vapor lean in fluorine compounds from the top of said vessel; and removing a liquid enriched with fluorine compounds at a second concentration from said vessel at a location below said first feed location, said second concentration being greater than said first concentration.

13. A process as in claim 12, wherein said multicomponent fluid contains at least one diluent component selected from the group consisting of nitrogen, oxygen, argon and helium.

14. A process as in claim 12, wherein each of said fluorine compounds contains at least one fluorine atom.

15. A process as in claim 12, wherein said multicomponent fluid contains at least one fluorine compound from the group consisting of nitrogen trifluoride ($NF_3$), freon –14 or tetrafluoromethane ($CF_4$), freon –23 or trifluoromethane ($CHF_3$) and hexafluoroethane ($C_2F_6$).

16. A process as in claim 11, wherein said first concentration is less than or equal to about 50 mole %.

17. A process as in claim 12, wherein said cryogenic liquid is selected from the group consisting of liquid nitrogen, liquid oxygen, liquid argon, liquid helium, and mixtures thereof.

18. A process as in claim 12, wherein said multicomponent fluid is directly contacted with said cryogenic liquid in said heat and mass transfer zone.

19. A process as in claim 12, wherein said liquid enriched with said fluorine compounds at a second concentration is transferred to a separation unit comprising at least one distillation column.

20. A process as in claim 12, wherein said multicomponent fluid is indirectly heat exchanged with said vapor lean in said fluorine compounds.

21. A process as in claim 11, wherein at least a portion of said liquid enriched with fluorine compounds at a second concentration is held in a storage container.

22. A process as in claim 21, wherein said storage container is at or near said bottom of said vessel.

* * * * *